(12) United States Patent
Kim

(10) Patent No.: US 6,519,475 B1
(45) Date of Patent: Feb. 11, 2003

(54) EARPHONE-MICROPHONE COMBINATION INCLUDING A RADIO MODULE AND METHOD OF SHIFTING ITS OPERATIONAL MODE BETWEEN TELEPHONE MODE AND RADIO MODE

(75) Inventor: Soo-Ryeol Kim, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/416,935

(22) Filed: Oct. 13, 1999

(30) Foreign Application Priority Data

Oct. 13, 1998 (KR) .............................. 98-43266

(51) Int. Cl.⁷ ................................. H04B 1/38
(52) U.S. Cl. ..................... 455/557; 455/426; 455/568; 455/569; 455/344
(58) Field of Search ............................... 455/550, 566, 455/569, 575, 90, 344, 553, 556, 557, 568, 426, 454; 381/309, 311, 123, 315

(56) References Cited

U.S. PATENT DOCUMENTS

| | | | | |
|---|---|---|---|---|
| 5,634,203 A | * | 5/1997 | Ghaem ........................ 455/134 |
| 5,694,467 A | * | 12/1997 | Young, III .................. 379/430 |
| 5,978,689 A | * | 11/1999 | Tuoriniemi et al. ......... 455/351 |
| 5,991,637 A | * | 11/1999 | Mack et al. ................. 455/550 |
| 6,091,812 A | * | 7/2000 | Iglehart et al. ........ 379/110.01 |
| 6,091,832 A | * | 7/2000 | Shurman et al. ............. 381/381 |
| 6,154,649 A | * | 11/2000 | Reichstein .................. 455/426 |
| 6,195,570 B1 | * | 2/2001 | Ishida ........................ 455/566 |
| 6,285,867 B1 | * | 9/2001 | Boiling et al. .............. 455/404 |
| 6,304,764 B1 | * | 10/2001 | Pan ............................. 455/569 |
| 6,374,126 B1 | * | 4/2002 | MacDonald, Jr. et al. .. 455/569 |

OTHER PUBLICATIONS

Motorola, Inc. "Motorola Digital Wireless Telephone User's Guide (V60)", 2001. 90–92.*

* cited by examiner

Primary Examiner—Edward F. Urban
Assistant Examiner—Charles Craver
(74) Attorney, Agent, or Firm—Dilworth & Barrese, LLP

(57) ABSTRACT

A device for enabling an earphone-microphone combination including a radio module to be used for a mobile phone, comprises a switching device for changing the operational mode of the radio module between telephoning mode and radio mode according to first and second mode selection signals, the radio module being muted in the telephoning mode, and a radio module interface connector connected with the hands-free kit interface connector of the mobile phone both to supply the power of the mobile phone battery to the radio module and to communicate the first and second mode signals and audio signals between the mobile phone and radio module or the earphone-microphone combination.

7 Claims, 3 Drawing Sheets

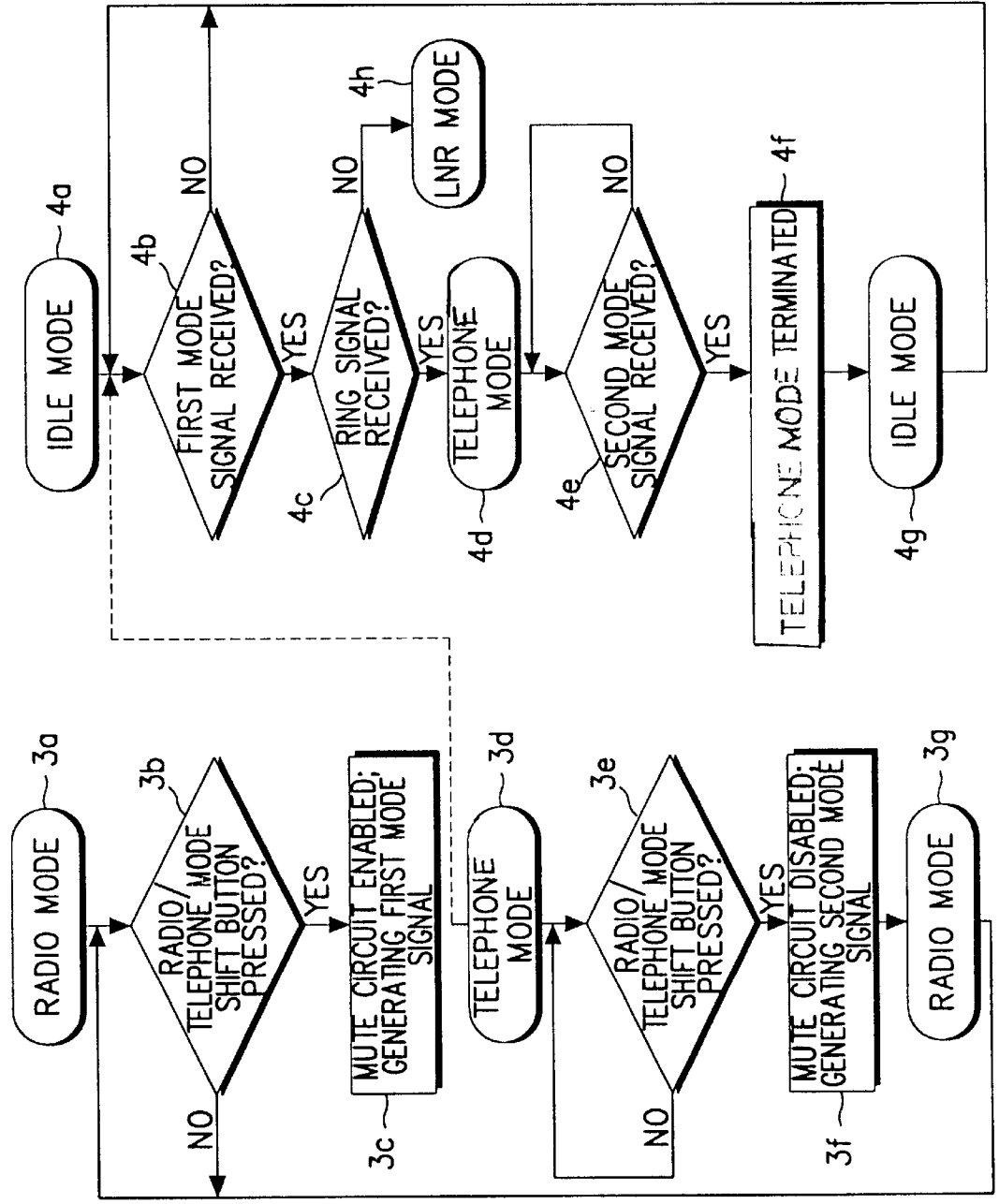

EARPHONE-MICROPHONE COMBINATION INCLUDING A RADIO MODULE AND METHOD OF SHIFTING ITS OPERATIONAL MODE BETWEEN TELEPHONE MODE AND RADIO MODE

BACKGROUND OF THE INVENTION

1. Field of the Invention

The present invention relates to an earphone-microphone combination used simultaneously for both a mobile phone and a radio receiving set (hereinafter referred to as "radio"), and a method of shifting its operational mode between a telephone mode and a radio mode.

2. Description of the Related Art

Generally, the earphone-microphone combination enables the user of a mobile phone to perform hands-free telephone functions with a mobile phone set, where the mobile phone set is located in a hands-free kit or in a pocket or carry bag. Similarly, an earphone enables the user of a portable palm-sized radio to listen to the radio hands free. On occasions when the user wants to simultaneously carry and use both the mobile phone and the radio while keeping his hands free, he must have both an earphone-microphone combination for the mobile phone and an earphone for the radio. Therefore, the prior art suffers the disadvantage of requiring redundant hardware, which causes the user inconvenience in addition to increasing his costs.

Accordingly a need exists for an earphone-microphone combination and specially designed radio mobile which allows a user to use both a mobile phone and a radio receiving set simultaneously, with a common earphone-microphone combination.

SUMMARY OF THE INVENTION

It is an object of the present invention to provide an earphone-microphone combination including a radio module, which may be used for a mobile phone.

It is another object of the present invention to provide a method of shifting the operational mode of such earphone-microphone combination between telephone mode and radio mode.

According to an aspect of the present invention, a device for enabling an earphone-microphone combination including a radio module to be used for a mobile phone, comprises a switching device for changing the operational mode of the radio module between a telephone mode and a radio mode according to first and second mode selection signals, the radio module being muted in the telephone mode, and a radio module interface connector connected with the hands-free kit interface connector of the mobile phone both to supply the power from the mobile phone battery to the radio module and to communicate the first and second mode signals and voice signals between the mobile phone and radio module or the earphone-microphone combination.

According to another aspect of the present invention, a method of controlling the operational mode of an earphone-microphone combination provided with a radio module connected to the hands-free kit interface connector of a mobile phone to receive the battery power of the mobile phone, comprises the steps of changing the operational mode of the radio module to a telephone mode by muting the radio module in response to a first mode signal inputted by the user when the radio module is in a radio mode, causing the operational mode of the mobile phone to change from an idle mode to the telephone mode by detecting a ring signal upon receiving the first mode signal, changing the operational mode of the radio module to the radio mode by un-muting the radio module in response to a second mode signal inputted by the user, and causing the operational mode of the mobile phone to change from the telephone mode to the idle mode in response to the second mode signal.

BRIEF DESCRIPTION OF THE ATTACHED DRAWINGS

The above and other objects, features, and advantages of the present invention will now be described more specifically with reference to the attached drawings in which:

FIG. 3 is a flow chart illustrating a method of shifting the operational mode of an earphone-microphone combination according to the present invention.

DETAILED DESCRIPTION OF THE PREFERRED EMBODIMENT

Figure 1:
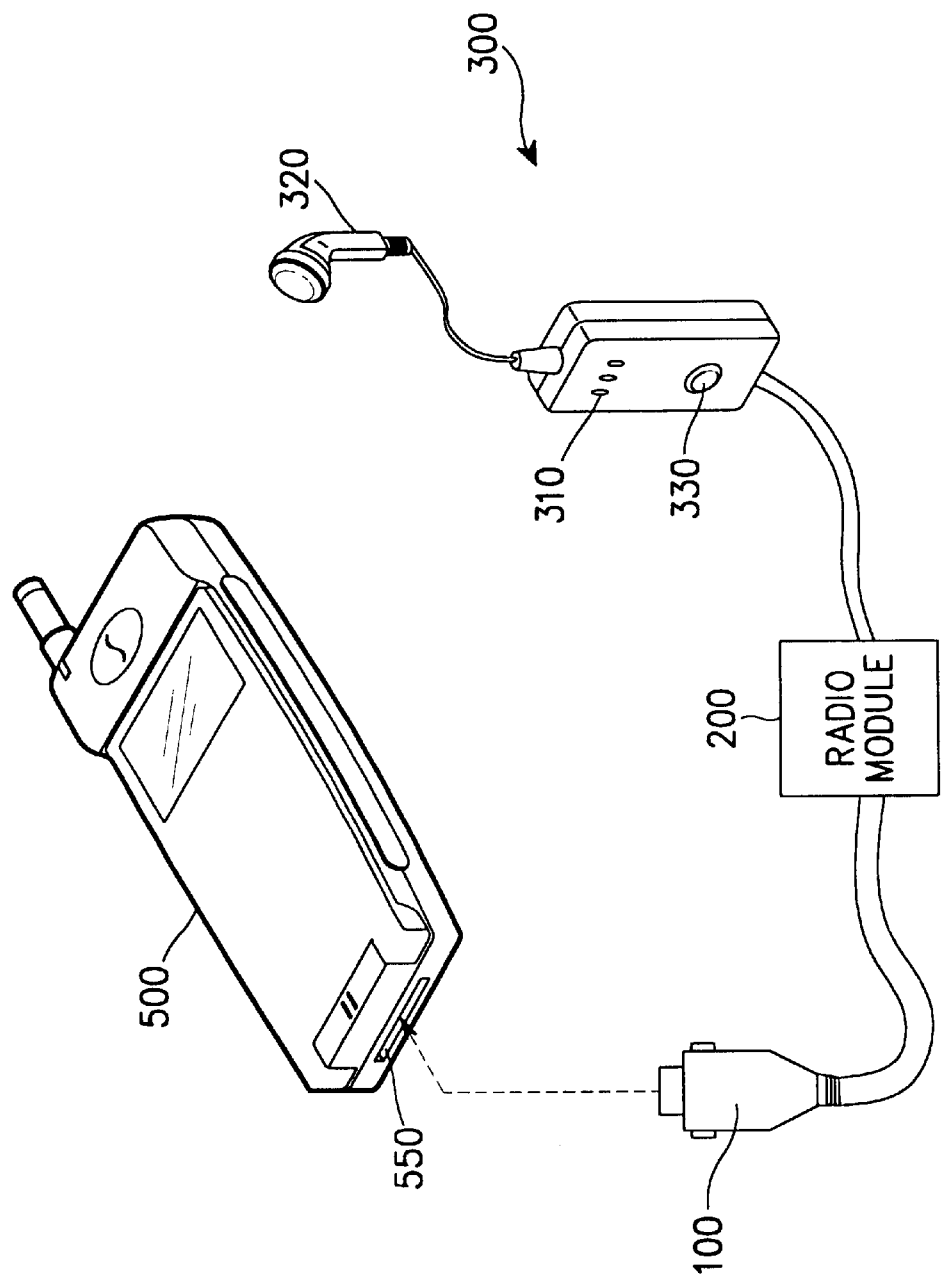
FIG. 1 is a perspective view illustrating a radio module including an earphone-microphone combination that is connected with a mobile phone according to the present invention.

Turning now to the drawings, in which like reference numerals are used to identify similar or identical components throughout the several views and detailed descriptions of the conventional components are omitted to clarify the inventive concept, the present invention will be described hereinbelow.

Referring to FIG. 1, an earphone-microphone combination 300 consists of an earphone 320 for converting electrical signals of a mobile phone 500 or a radio into audible sounds and a microphone 310 for converting speech into electrical signals transmitted to the mobile phone 500. A radio module 200 is connected with the earphone-microphone combination 300. The operational mode of the radio module 200 may be alternated between radio mode for listening to the radio, and telephone mode, for allowing telephone communication from the mobile phone by muting the radio module. The user alternates between the radio and telephone modes by depressing the mode change button 330.

A radio module interface connector 100 is connected to the hands-free interface connector of the mobile phone 500, both to supply the battery power of the mobile phone to the radio module and to allow the transfer of signals. First and second mode signals and voice signals are transferred between the mobile phone 500, the radio module 200 and earphone-microphone combination 300. The mobile phone 500 senses the connection with the earphone-microphone combination 300, and the radio module, by detecting that a signal in a specified port of its serial input/output part 550, such as a request-to-send (RTS) signal in an RS232C protocol, is changed from a high state to a low state.

Figure 2:
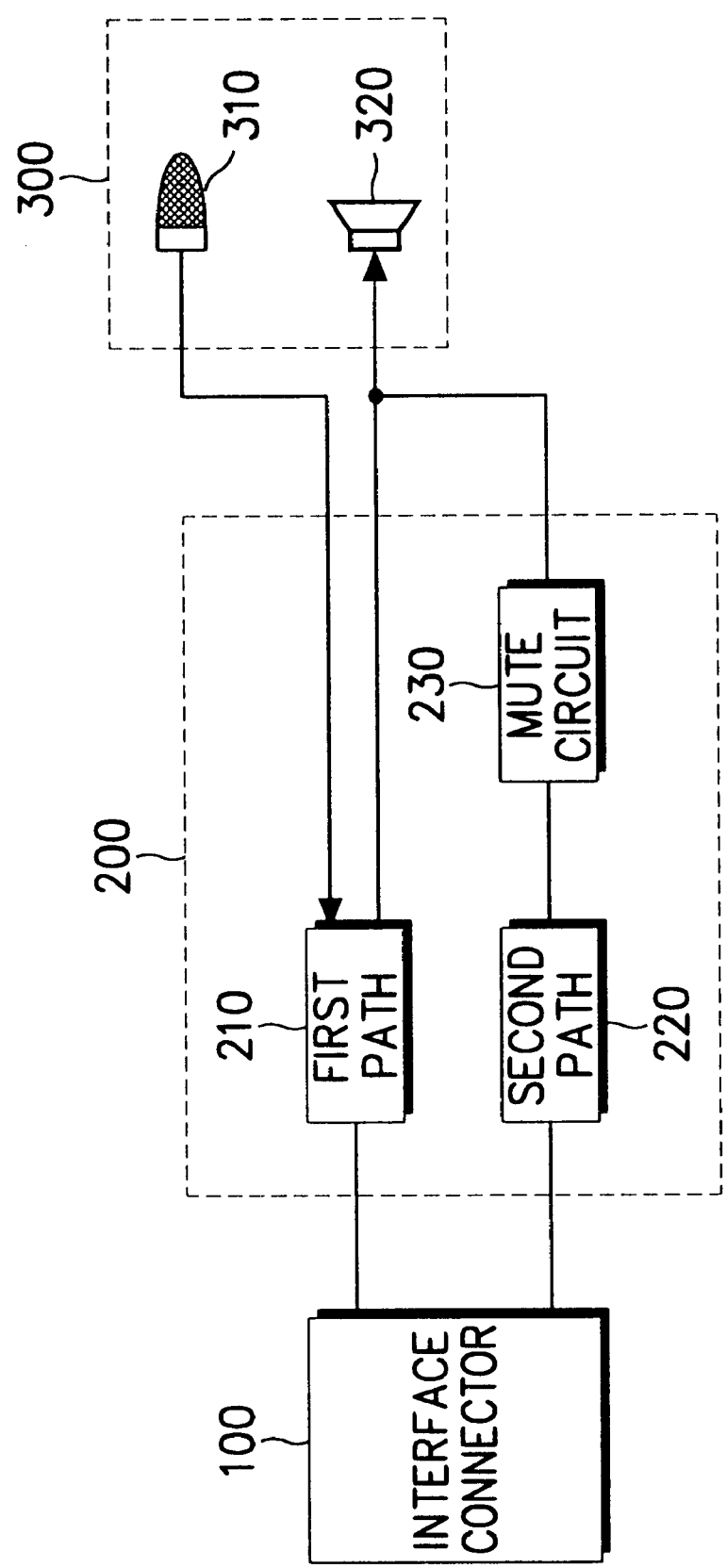
FIG. 2 is a block diagram illustrating the structure of an earphone-microphone combination connected through a radio module with a mobile phone according to the present invention.

Referring to FIG. 2, the radio module 200 comprises the various devices that are included in a radio receiving set, such as tuner, volume controller, power on/off key, etc. It is also provided with additional circuits in accordance with the invention. More specifically, the radio module 200 also includes a first path 210 for connecting the audio terminal of the hands-free kit interface connector of the mobile phone 500 via the interface connector 100 to the earphone 320 and a microphone 310, a second path 220 for providing the radio audio signals of the radio module to the earphone 320, and a mute circuit 230 interposed between the earphone 320 and the second path 220 for muting the radio audio signals according to the first mode signal generated when the operational mode of the radio module is changed from the radio mode to the telephone mode for performing telephone functions.

FIG. 3 illustrates a method of controlling the operational mode of the earphone-microphone combination and the radio module. The steps 3a to 3g represent the operation of the radio module 200, and steps 4a to 4h represent that of the mobile phone. There are three situations requiring the user to press the mode change button 330 shown in FIG. 1 to alternate between a radio mode and a telephone mode. The first situation arises when the user wishes to transmit a call signal (to place a call) while listening to the radio. The second situation arises when the user receives a call signal while listening to the radio. In the latter situation the user is notified via a ring signal or vibration of the mobile phone 500. In the two situations above, the user is in the radio mode and wishes to change to a telephone mode. In the third situation, the user has just finished a call, whether received or transmitted by him, and wishes to return to listening to the radio, or more particularly, to change back to the radio mode.

Referring to steps 3a to 3c, when the radio/telephoning mode shift button 330 is pressed to change the operational mode of the radio module 200 from the radio mode to the telephone mode, the radio module 200 generates the first mode signal, enabling the mute circuit 230 to mute the radio sounds. The first mode signal is generated by changing a signal in the specified port (for example, the ring indicator of the data cable using RS232C protocol) of the serial input/output part 550 from a high state to a low state. In such a case, according to steps 4a to 4d, the mobile phone 500 is changed to the telephone mode from an idle mode upon detecting a ring signal after the first mode signal is received.

According to the subsequent steps 3d to 3g, if the user again presses the mode shift button 330 to generate the second mode signal, the radio module 200 disables the mute circuit to change to the radio mode. The second mode signal is also generated by changing a signal in the specified port of the mobile phone connected with the radio module interface connector 100 from the low state to the high state. As described above, the mode shift button 330 alternates the operational mode between the radio and the telephone modes whenever pressed. Accordingly, the mobile phone 500 is then changed to the idle mode, thereby terminating the telephone mode, upon receiving the second mode signal, according to steps 4e to 4g. Meanwhile, if a ring signal is not detected in step 4c, the mobile phone 500 is changed to the last number redial (LNR) mode in step 4h. Here, the user may directly dial a phone number or use the LNR feature.

Thus, the inventive earphone-microphone combination including the radio module of the present invention enables the user of a mobile phone both to perform telephone functions and to listen to the radio without the need for an additional radio or earphones. Moreover, the radio module is supplied with the battery power of the mobile phone, thereby eliminating the need for a separate battery.

While the present invention has been described in connection with specific embodiments accompanied by the attached drawings, it will be readily apparent to those skilled in the art that various changes and modifications may be made thereto without departing from the scope of the present invention as described by the appended claims.

What is claimed is:

1. A device for enabling an earphone-microphone combination to be commonly used to provide radio listening and mobile phone operation, comprising:
   a switching device for changing an operational mode of a radio module between telephone mode and radio mode according to first and second mode selection signals, respectively, said radio module being muted by a muting circuit connected between said radio module and said earphone-microphone combination during said telephone mode; and
   a radio module interface connector connected with a hands-free kit interface connector of said mobile phone to communicate said first and second mode signals and mobile phone audio signals between said mobile phone and said radio module, said mobile phone audio signals being supplied to said earphone-microphone combination,
   wherein if a ring signal is detected upon detection of a first mode signal said muting circuit mutes said radio module and switches said mobile phone from an idle mode to a phone answer mode, else said muting circuit mutes said radio module and said mobile phone changes to a last number redial mode to allow a user to dial a telephone number or use a last number redial function.

2. The device recited in claim 1, wherein said radio module includes:
   a first path for connecting an audio terminal of said hands-free kit interface connector of said mobile phone with said earphone-microphone combination to supply said mobile phone audio signals to said earphone-microphone combination;
   a second path for supplying radio audio signals of said radio module to said earphone-microphone combination; and
   a mute circuit interposed between said earphone-microphone combination and said second path to mute said radio signals in response to said first mode signal generated when changing said operational mode from said radio mode to said telephone mode.

3. The device recited in claim 1, wherein the radio module is powered by a battery in the mobile phone, said battery power being supplied through the radio module interface connector.

4. The device recited in claim 2, wherein said mute circuit is disabled in response to a said second mode signal being generated.

5. The device recited in claim 4, wherein said radio module further includes a user accessible switch for alternating between the operational modes.

6. A method of controlling an operational mode of an earphone-microphone combination provided with a radio module connected to a hands-free kit interface connector of a mobile phone, comprising the steps of:
   changing an operational mode of said radio module to a telephone mode by muting by a muting circuit connected between said radio module and said earphone-microphone combination a radio audio signal of said radio module in response to a first mode signal inputted by a user when said radio module is in a radio mode;
   causing the operational mode of said mobile phone to change from an idle mode to said telephone mode by detecting a ring signal upon receiving said first mode signal;
   changing the operational mode of said radio module to said radio mode by un-muting said radio audio signal in response to a second mode signal inputted by the user; and causing the operational mode of said mobile phone to change from said telephone mode to said idle mode in response to said second mode signal, wherein if a ring signal is not detected upon detection of a first mode signal said mobile phone changes to a last number redial mode to allow the user to dial a telephone number or use a last number redial function.

7. The method recited in claim 6, including the further step of causing said mobile phone to retransmit a call signal by the last called phone number upon not detecting said ring signal.

* * * * *

UNITED STATES PATENT AND TRADEMARK OFFICE
CERTIFICATE OF CORRECTION

PATENT NO.    : 6,519,475 B1
DATED         : February 11, 2003
INVENTOR(S)   : Soo-Ryeol Kim It is certified that error appears in the above-identified patent and that said Letters Patent is hereby corrected as shown below:

Title page,
Item [30], Foreign Application Priority Data, "Oct. 13,1998 (KR) ............. 98-43266" should be -- Oct. 16,1998 (KR) ............. 98-43265 --.

Signed and Sealed this

Fifth Day of August, 2003

JAMES E. ROGAN
*Director of the United States Patent and Trademark Office*